US012568964B2

(12) United States Patent
Tomasi

(10) Patent No.: US 12,568,964 B2
(45) Date of Patent: Mar. 10, 2026

(54) **PHYTOSANITARY AGENT AND ITS PARTICULAR USE IN THE TREATMENT OF PLANTS INFECTED BY *XYLELLA FASTIDIOSA***

(71) Applicant: VEXTACHEM S.R.L., Latina (IT)

(72) Inventor: Costantino Tomasi, Soleto (IT)

(73) Assignee: VEXTACHEM S.R.L., Latina (IT)

( * ) Notice: Subject to any disclaimer, the term of this patent is extended or adjusted under 35 U.S.C. 154(b) by 931 days.

(21) Appl. No.: 17/776,653

(22) PCT Filed: Nov. 15, 2019

(86) PCT No.: PCT/IB2019/059838

§ 371 (c)(1),
(2) Date: May 13, 2022

(87) PCT Pub. No.: WO2021/094818

PCT Pub. Date: May 20, 2021

(65) Prior Publication Data

US 2023/0000077 A1 Jan. 5, 2023

(51) Int. Cl.

| | |
|---|---|
| ***A01N 31/16*** | (2006.01) |
| ***A01N 25/12*** | (2006.01) |
| ***A01P 1/00*** | (2006.01) |
| ***A01P 3/00*** | (2006.01) |

(52) U.S. Cl.

CPC ............. *A01N 31/16* (2013.01); *A01N 25/12* (2013.01); *A01P 1/00* (2021.08); *A01P 3/00* (2021.08)

(58) Field of Classification Search

CPC ........ A01N 35/06; A01N 33/12; A01N 37/32; A01N 43/16; A01N 43/90; A01N 2300/00; A01N 25/10; A01N 31/08; A01N 31/16; A01N 33/04; A01N 35/04; A01N 37/12; A01N 41/12; A01N 59/24; A01N 65/00; A01N 65/08; A01N 65/20; A01N 59/00; A01N 25/12; A01P 1/00; A01P 3/00

See application file for complete search history.

(56) References Cited

U.S. PATENT DOCUMENTS

| | | | | |
|---|---|---|---|---|
| 2006/0003894 A1* | 1/2006 | Cutler | A01N 35/06 | 514/682 |
| 2014/0343165 A1* | 11/2014 | Stich | A01N 43/08 | 514/682 |

FOREIGN PATENT DOCUMENTS

| | | | | |
|---|---|---|---|---|
| AU | 2018218164 A1 | | 9/2019 | |
| KR | 20130063708 A | * | 6/2013 | A01N 31/04 |
| RU | 2061374 C1 | * | 5/1990 | A01N 35/06 |
| WO | 2011103610 A2 | | 9/2011 | |

OTHER PUBLICATIONS

RU2061374C1 translation enclosed in IDS dated May 13, 2022 (Year: 1990).*

International Search Report and Written Opinion for corresponding International Patent Application No. PCT/IB2019/059838 mailed Jul. 17, 2020. 11 pages.

Zhang et al. "Identification and characterization of menadione and benzethonium chloride as potential treatments of Pierce's disease of grapevines." Phytopathology 109.2 (2019): 233-239.

* cited by examiner

*Primary Examiner* — Audrea B Coniglio
(74) *Attorney, Agent, or Firm* — Leason Ellis LLP

(57) ABSTRACT

The invention relates to the use of an organometallic coordination complex or its phytopharmaceutically acceptable salt of a $M^{m+}$ metal and of at least one L ligand, where $M^{m+}$ is a transition metal having an oxidation number m, L is a ligand of general formula (VII) or its anion, wherein $R^1$ is selected from the group consisting of oxygen, mono or polycyclic alkyl, naphthalene residue, anthracene residue and their hydroxylated or ketone derivatives; $R^2$ and $R^3$ are identical or different and are selected independently of each other from hydrogen, halogen, a hydroxyl group, an alkoxy group, a linear or branched alkyl group, a cycloalkyl group or $R^2$ and $R^3$ together forming a benzene derivative; $R^6$, $R^7$ and $R^8$ are identical or different and independently of each other are selected from hydrogen, a hydroxyl group, an alkoxy group, a linear or branched alkyl group, a cycloalkyl group, a phenyl group, an aryl group in the treatment of *Xylella fastidiosa* in a plant. The invention also concerns the use of the compound of formula (VII) in the treatment of *Xylella fastidiosa* in a plant, also in combination with the organometallic coordination complex. Advantageously, the invention concerns the treatment of olive trees.

11 Claims, 3 Drawing Sheets

PHYTOSANITARY AGENT AND ITS PARTICULAR USE IN THE TREATMENT OF PLANTS INFECTED BY *XYLELLA FASTIDIOSA*

CROSS-REFERENCE TO RELATED PATENT APPLICATIONS

This application is a U.S. National Stage Application under 35 U.S.C. § 371 of International Patent Application No. PCT/IB2019/059838 filed Nov. 15, 2019, which is incorporated by reference in its entirety. The International Application was published on May 20, 2021, as International Publication No. WO 2021/094818 A1.

The present invention relates to the use of an organometallic coordination complex and/or its ligand as a phytosanitary agent in plants, in particular in the treatment of bacterial infections from *Xylella fastidiosa*, preferably olive plant.

STATE OF THE ART DESCRIPTION

In recent years in Italy, numerous harmful organisms have been inadvertently introduced in the agricultural sector through the importation of infected plant material, such as the black mange of the potato (*Synchytrium endobioticum*), the bacterial cancer of the actinidia (*Pseudomonas syringae*) and the gram negative bacterium *Xylella fastidiosa*. It is estimated that since 2013, in the Puglia region in southern Italy, the bacterium *Xylella fastidiosa* has infected about 6.5% of monitored olive plants, causing huge environmental and economic impact for farmers, as well as a dramatic drop in oil production of the region.

*X. fastidiosa* has been recognized as a quarantine pathogen capable of causing serious phytosanitary pandemics in the territories in which it is established and has therefore been included in the A1 list of the European and Mediterranean plant protection organization EPPO, directive 2000/29/EC.

This bacterium, particularly dangerous in the agricultural sector, belongs to the Xanthomonadaceae family and is characterized by high genetic and phenotypic variability. In fact, four subspecies of *Xylella* are known, which are able to infect about 150 different types of plants.

However, the attack mechanism is similar for all varieties of the bacterium, in fact the *Xylella*, not being a sporogenic bacterium, is transmitted through insect vectors, in particular those of the family of Cicadellidae, which feed on sucking from the lymphatic vessels of plants. These insects, feeding on an infected plant, then transmit the bacterium to a healthy plant. Once transmitted to the healthy host plant, the bacterium multiplies in the xylem vessels, whose function is to lead the raw sap rich in nutrients from the roots to the stem and leaves. Bacterial multiplication continues until these vessels are blocked through the creation of a sort of gel that prevents the regular flow of raw sap. After this colonization, in the plant a series of biological alterations develop which can determine even the death of the plant itself.

Among the diseases caused by *X. fastidiosa* the "Pierce's disease" stand out, which can be destructive on the grapevine, the variegated chlorosis of citrus fruits and the complex of the rapid dessiccation of the olive plant. Equally serious diseases may affect also almond, apple, pear, oleander and various species of forest essences and ornamental plants.

The typical and most frequent symptoms of these diseases include the burning of the leaves, the reduced growth and the desiccation of the branches and shoots.

Although this bacterium has been known for over a century, there is still no effective therapy for treating sick plants.

To date, there is a sort of containment of the infection in the environment through essentially two practices.

Not being able to act on the bacterium itself, the first practice is based on trying to hit the vector, i.e. the insects that spread the bacterium, through insecticidal treatments and cutting often the grass, to eliminate larvae and insects that are still young.

However, the drawbacks associated with the use of insecticides which at high doses, can cause significant damage also in humans, are well known, such as for example dizziness, headache, nausea, muscle spasms, convulsions, respiratory difficulties, rashes, endocrine disruption, reproductive problems, learning disabilities, etc.

Furthermore, although the use of insecticidal products leads to a reduction in the spread of the bacterium, it is still necessary to use the second practice in combination in order to contain the propagation of the microorganism.

This second practice consists in the reduction of the bacterium reservoir by felling the infected plants.

The tree felling, however, involves huge losses both from the environmental point of view for the eradication of plants, especially the olive plants, which for the most part are secular plants, and from the point of view of the oil supply, because the number of olives to be squeezed decreases.

Not least, especially from the farmers point of view, the tree felling causes huge losses at the economic level both for the lack of production and sale of oil and for the time required between the cultivation of a new olive plant and the time when it reaches the production regime.

The present invention aims to overcome the limitations and drawbacks of the treatments for the eradication of *X. fastidiosa*, indicated above.

The purpose of the invention is to provide a treatment of *Xylella fastidiosa* infections in plants, particularly in olive plants, that overcomes the drawbacks of the prior art.

SUMMARY OF THE INVENTION

The above purpose was achieved by an organometallic coordination complex.

The invention therefore concerns the use of an organometallic coordination complex, or its phytopharmaceutically acceptable salt, of a $M^{m+}$ metal and at least one L ligand, where $M^{m+}$ is a transition metal having an oxidation number m, L is a binder of general formula (VII)

(VII)

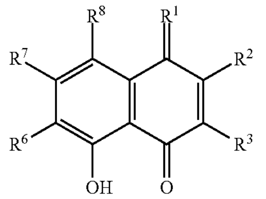

or its anion, wherein $R^1$ is selected from the group consisting of oxygen, mono or polycyclic alkyl, naphthalene residue, anthracene residue and their hydroxylated or ketone derivatives;

$R^2$ and $R^3$ are identical or different and are selected independently of each other from hydrogen, halogen, a hydroxyl group, an alkoxy group, a linear or branched alkyl group, a cycloalkyl group or $R^2$ and $R^3$ together forming a benzene derivative;

$R^6$, $R^7$ and $R^8$ are identical or different and are selected independently of each other from hydrogen, a hydroxyl group, an alkoxy group, a linear or branched alkyl group, a cycloalkyl group, a phenyl group, an aryl group, in the treatment of *Xylella fastidiosa* in plants.

In a preferred and advantageous embodiment of the invention, the transition metal is selected from Cu, Zn and Ni, more preferably Cu.

Advantageously, the ligand L is 5-hydroxy-naphthalene-1,4-dione.

In a more preferred embodiment, the organometallic complex of the invention has therefore general formula (I)

(I)

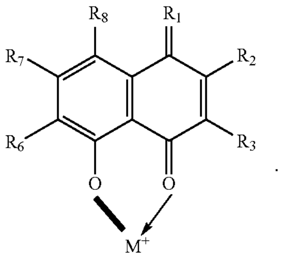

Therefore, the aforementioned purposes are achieved by the use of a coordination complex of general formula (I) as a phytosanitary agent.

By definition, an organometallic coordination complex is a compound commonly formed by an ion of a positively charged transition metal that is coordinated to neutral organic molecules or negatively charged ions, called ligands.

The inventors have also found that the ligand L of formula (VII) or a phytopharmaceutically acceptable salt thereof was able to act alone as a phytosanitary agent against *X. fastidiosa.*

Therefore, in another aspect the invention relates to the use of a compound of general formula (VII)

(VII)

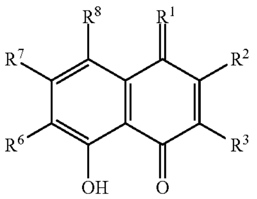

or a phytopharmaceutically acceptable salt thereof, wherein $R^1$ is selected from oxygen, mono or polycyclic alkyl, naphthalene residue, anthracene residue and their hydroxylated or ketone derivatives;

$R^2$ and $R^3$ are identical or different and are selected independently of each other from hydrogen, halogen, a hydroxyl group, an alkoxy group, a linear or branched alkyl group, a cycloalkyl group or $R^2$ and $R^3$ together forming a benzene derivative;

$R^6$, $R^7$ and Fe are identical or different and independently of each other are selected from hydrogen, a hydroxyl group, an alkoxy group, a linear or branched alkyl group, a cycloalkyl group, a phenyl group, an aryl group in the treatment of *Xylella fastidiosa* in a plant.

Advantageously, the compound (VII) of the invention applied on an infected plant is absorbable by the plant and can reach the xylem vessels of the same where it fulfils its phytopharmaceutical function.

Without being bound by any theory, the inventors believe that the ligand L of formula (VII) alone and complexed with a transition metal is able to be absorbed and allow phytopharmaceutical action on plants against bacteria, in particular *Xylella fastidiosa*, in an unexpected and surprising way.

This ability to be absorbed by the plant, in fact, makes the aforementioned compound (VII), alone or complexed, particularly suitable especially for the use in the treatment of plants infected with *Xylella fastidiosa*, preferably in olive plants infected by this bacterium.

The invention also concerns a phytosanitary composition for treating plant bacterial infections.

Therefore, in a further aspect the invention concerns a phytopharmaceutical composition comprising the organometallic coordination complex or its phytopharmaceutically acceptable salt as defined above and the compound of formula (VII) or its phytopharmaceutically acceptable salt.

This composition is therefore useful for treating *Xylella fastidiosa* in plants, preferably olive plants.

DETAILED DESCRIPTION OF THE INVENTION

Figure 1:
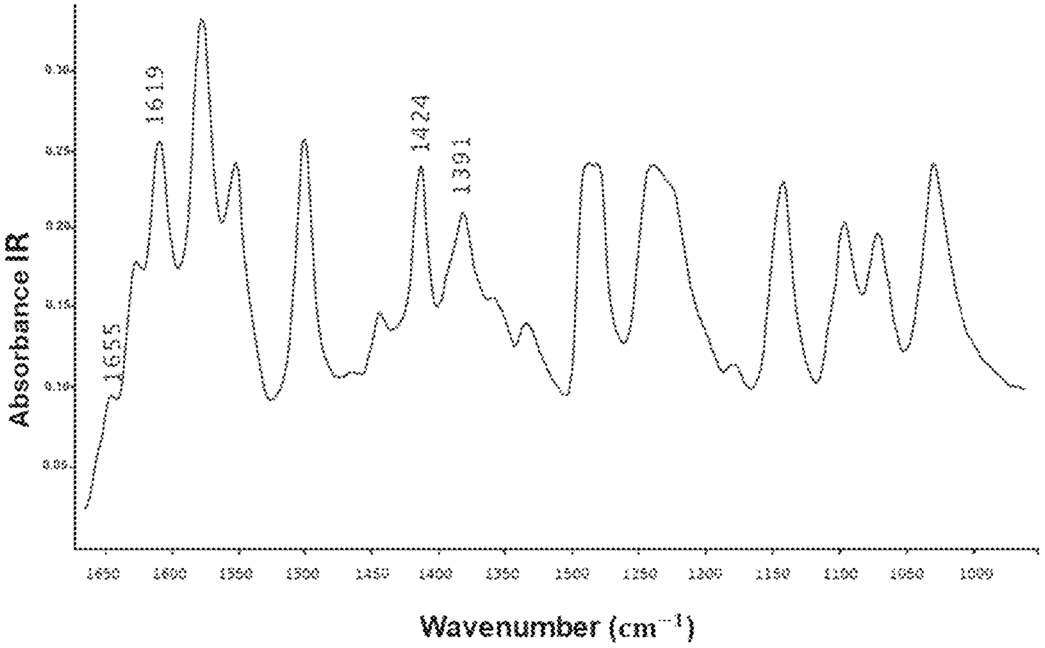
FIG. 1 shows the experimental InfraRed (IR) spectrum of the coordination complex 5-hydroxy-naphthalen-1,4-dione complexed with copper.

The invention concerns the use of an organometallic coordination complex, or its phytopharmaceutically acceptable salt, of an $M^{m+}$ metal and at least one L ligand, where $M^{m+}$ is a transition metal having an oxidation number m, L is a binder of general formula (VII)

(VII)

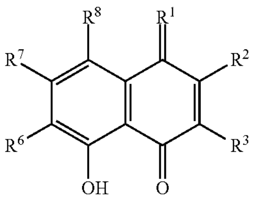

or its anion, wherein $R^1$ is selected from the group consisting of oxygen, mono or polycyclic alkyl, naphthalene residue, anthracene residue and their hydroxylated or ketone derivatives;

$R^2$ and $R^3$ are identical or different and are selected independently of each other from hydrogen, halogen, a hydroxyl group, an alkoxy group, a linear or branched alkyl group, a cycloalkyl group or $R^2$ and $R^3$ together forming a benzene derivative;

$R^6$, $R^7$ and $R^8$ are identical or different and are selected independently of each other from hydrogen, a hydroxyl group, an alkoxy group, a linear or branched alkyl group, a cycloalkyl group, a phenyl group, an aryl group, in the treatment of *Xylella fastidiosa* in plants.

$M^{m+}$ is a transition metal having an oxidation number m.

Preferably, m is equal to 2.

Preferably, the transition metal $M^{m+}$ is selected from the metals of the fourth period of the periodic table, more preferably, the transition metal $M^{m+}$ is selected from the group consisting of manganese, iron, cobalt, nickel, copper and zinc.

More preferably, the aforementioned transition metal is selected from copper and zinc.

In an advantageous and preferred embodiment of the invention, the transition metal is copper.

The organometallic coordination complex with copper of the invention was found to be particularly advantageous not only for the phytosanitary agent properties, but also as an anticryptogamic agent, in fact copper is a known metal with antifungal abilities. Advantageously the coordination complex of the invention is in fact absorbable by the plant where it is applied, and can therefore act as a vehicle for the copper complexed to it.

Still advantageously, the use of copper in the agricultural sector is also authorized in organic farming, and for some particular applications even in biodynamic agriculture.

The organometallic coordination complex of the invention comprises at least one ligand of Formula (VII).

In a preferred embodiment of the invention of the binder of formula (VII), $R^1$ is oxygen, $R^2$ and $R^3$ are identical or different and are selected independently of each other from hydrogen or a linear or branched $C_1$-$C_6$ alkyl group, i.e. having from 1 to 6 carbon atoms such as a methyl, ethyl, butyl, propyl, isopropyl, butyl, isobutyl, sec-butyl, ter-butyl group, etc; $R^6$, $R^7$ and $R^8$ are identical or different and are selected independently of each other from hydrogen, a hydroxyl group, a linear or branched $C_1$-$C_6$ alkyl group.

More preferably the ligand L of formula (VII) is 5-hydroxy-naphthalene-1,4-dione.

In a more preferred embodiment, the organometallic complex of use as phytosanitary in the treatment of *Xylella fastidiosa* of the invention has therefore general formula (I)

(I)

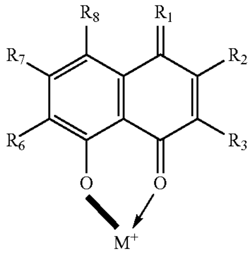

Therefore, the aforementioned purposes are also achieved by the use of a coordination complex of general formula (I) as a phytosanitary agent in the treatment of *Xylella fastidiosa.*

The at least one ligand L of formula (VII) of the coordination complex is preferably selected from the group consisting of ligand of formula (LII), (LIII), (LIV), (LV) and (LVI)

(LII)

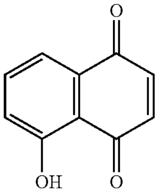

, (LIII)

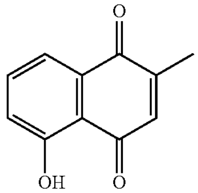

, (LIV)

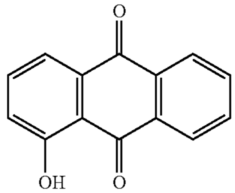

(LV) e

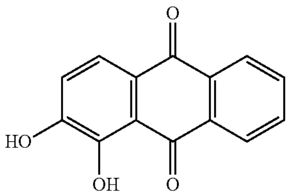

-continued (LVI)

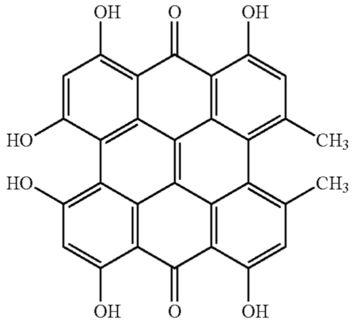

or their respective anions.

More preferably the at least one ligand L of formula (VII) is 5-hydroxy-naphthalene-1,4-dione or its anion, i.e. the ligand of formula (LII).

Particularly preferred in the present invention is the use of the coordination complex of formula (LII) 5-hydroxy-naphthalene-1,4-dione or its anion complexed with the aforementioned transition metal. In this preferred and advantageous embodiment of the invention, the transition metal is preferably selected from Cu, Zn and Ni, more preferably Cu, even more preferably with an oxidation state 2.

Advantageously, the ligand L of Formula (VII) is therefore 5-hydroxy-naphthalene-1,4-dione of formula (LII) or its anion.

The invention therefore concerns an organometallic coordination complex selected from the group consisting of the complex of formula (II), (III), (IV), (V), (VI) and (VIII)

(II)

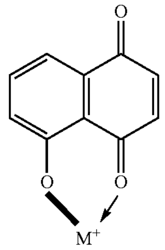

(III)

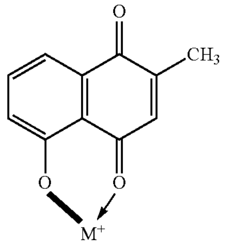

(IV)

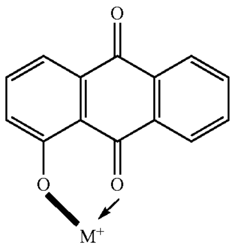

-continued (V)

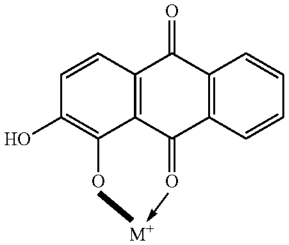

(VI)

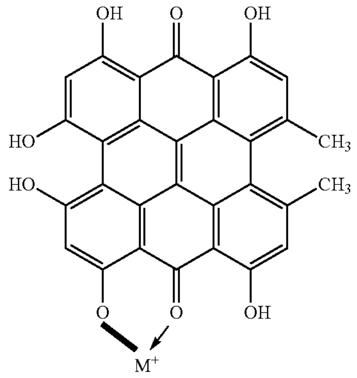

(VIII)

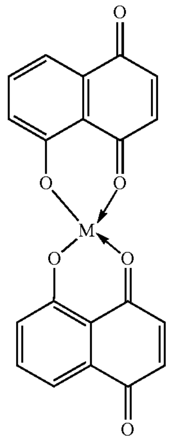

According to the invention, the organometallic coordination complex applied on the infected plant is absorbable by the plant itself and can reach the xylem vessels, where it fulfils its antibacterial and antifungal action.

As indicated above, this ability to be absorbed by the plant is particularly advantageous especially for the use in the treatment of plants infected with *Xylella fastidiosa*, in fact this bacterium nestles in the xylem vessels and it is therefore necessary for the phytosanitary agent to be absorbed in order to perform its function.

The inventors have also found that even only the ligand L of formula (VII) or its phytopharmaceutically acceptable salt was able to act alone as a phytosanitary agent against *Xylella fastidiosa*. Therefore, in another aspect the invention relates to the use of a compound of general formula (VII)

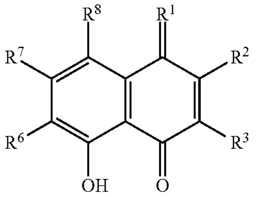
(VII)

or a phytopharmaceutically acceptable salt thereof, wherein $R^1$ is selected from the group consisting of oxygen, mono or polycyclic alkyl, naphthalene residue, anthracene residue and their hydroxylated or ketone derivatives;

$R^2$ and $R^3$ are identical or different and are selected independently of each other from hydrogen, halogen, a hydroxyl group, an alkoxy group, a linear or branched alkyl group, a cycloalkyl group or $R^2$ and $R^3$ together forming a benzene derivative;

$R^6$, $R^7$ and $R^8$ are identical or different and are selected independently of each other from hydrogen, a hydroxyl group, an alkoxy group, a linear or branched alkyl group, a cycloalkyl group, a phenyl group, an aryl group, in the treatment of *Xylella fastidiosa* in a plant.

The advantageous and preferred aspects indicated above for the organometallic coordination complex are the same as those of the compound of formula (VII), this latter being the ligand of the metal $M^{m+}$ of the complex of the invention.

The coordination complex of the invention and the ligand L of formula (VII) are used in the treatment of *Xylella fastidiosa* in plants.

The plant according to the invention is preferably selected from the group consisting of olive, citrus fruit, grapevine, almond, apple, pear, oleander, different species of forest essences and ornamental plants. More preferably, said plant is olive.

The invention also concerns a phytosanitary composition for treating plant bacterial infections, specifically in the treatment of *Xylella fastidiosa*.

The inventors have in fact observed that the combined use of the complex according to the invention together with the compound of Formula (VII) was effective in the treatment of *Xylella fastidiosa* in plants, preferably olive.

In the preferred and tested embodiment of the invention, wherein the compound of Formula (VII) or its anion is LII, the complexation with the aforementioned transition metal to form the coordination complex of the invention, enhances the antibacterial activity of 5-hydroxy-naphthalen-1,4-dione itself.

In a further aspect, therefore, the invention relates to a phytosanitary composition comprising the organometallic coordination complex or its phytopharmaceutically acceptable salt and the compound of formula (VII) or its phytopharmaceutically acceptable salt. The phytosanitary composition may comprise at least one phytopharmaceutically acceptable vehicle and/or at least one phytopharmaceutically acceptable excipient.

This phytosanitary composition is particularly suitable for use on plants in the treatment of bacterial and fungal pathogens, preferably in the treatment of *Xylella fastidiosa* infections.

In a further aspect, therefore, the invention concerns the use of the phytosanitary composition in the treatment of *Xylella fastidiosa* in plants.

The plant according to the invention is preferably selected from the group consisting of olive, citrus fruit, grapevine, almond, apple, pear, oleander, different species of forest essences and ornamental plants. More preferably, said plant is olive.

Preferably, the phytosanitary composition comprising the coordination complex of the invention, comprises the coordination complex in which the ligand L is 5-hydroxy-naphthalene-1,4-dione of Formula (LII) or its anion complexed with a transition metal $M^{m+}$.

The phytosanitary composition of the invention may comprise a coordination complex selected from the group consisting of the complex of Formula (II), (III), (IV), (V), (VI) and (VIII) and their respective anions above mentioned and their mixtures.

Preferably, this phytosanitary composition of the invention comprises at least one of 5-hydroxy-naphthalene-1,4-dione complexed with copper, 5-hydroxy-naphthalene-1,4-dione complexed with zinc or their mixtures.

According to the invention, this phytosanitary composition comprises the coordination complex of the invention mixed with the compound of formula (VII) of the invention.

Preferably the composition also comprises the compound of formula (VII), i.e. the compound 5-hydroxy-naphthalene-1,4-dione (LII).

Preferably, according to this embodiment, the coordination complex of the invention is present in a concentration of about 30-50 ppm and 5-hydroxy-naphthalene-1,4-dione is present in a concentration of about 40-50 ppm.

In particular, when in the phytosanitary composition of the invention the compound of formula (VII) is 5-hydroxy-naphthalene-1,4-dione (LII), it may be present in a synthetic form and/or in the form of a plant derivative. This compound is in fact present in nature in the leaf, root and bark of trees of the Juglandaceae family, in particular in the *Juglans nigra, J. regia, J. ailanthifolia, J. cathayensis, J. cinerea, J. hndsii, J. microcarpa* and *J. stenocarpa*, and can be obtained by known techniques, by desiccating and shredding the walnut husk.

The at least one phytopharmaceutically acceptable vehicle of the composition of the invention is preferably water, more preferably bidistilled water. Advantageously, the water is easily absorbed by the plant and has no environmental impact.

The phytosanitary composition of the invention can comprise one or more excipients among the conventional ones that will be chosen according to the usual practice.

Such excipients may include, among others, co-formulants which serve to reduce the concentration of the coordination complex, such as inert substances and diluents.

The composition of the invention can also comprise one or more adjuvant/excipients compounds that have the purpose of increasing the effectiveness of the coordination complex and of promoting its distribution.

Examples of such adjuvants include synergists, emulsifiers, wetting agents, tackifiers, humectants, propellants for aerosol formulations, inert diluents, anti-drift, anti-foaming agents, preservatives, etc.

Particularly preferred examples of synergistic adjuvants of the phytosanitary composition of the invention include colloidal copper, colloidal silver, powdered walnut husk, aloin, an aloe extract and their mixtures.

Advantageously, the powdered walnut husk comprises 5-hydroxy-naphthalen-1,4-dione in a percentage variable between 0.05 and 0.25%, which increases the antibacterial action of the composition itself.

The phytosanitary composition of the present invention can be in liquid or solid form.

Examples of liquid formulations include wettable powders wherein the coordination complex and/or compound (VII) is finely ground in the presence of wetting, dispersing, inert excipients and others per se known, to obtain a product able to form a suspension, when mixed in water.

Another example of a liquid formulation comprises the soluble powder, that is, a powder formulation such as the previous one, which forms a stable dilute solution, when mixed in water.

The phytosanitary composition can also be in the form of an emulsion in water, preferably in presence of surfactants, dispersants or other stabilizers to ensure stability.

The composition can also be in the form of dispersible granules, suspensions of microcapsules wherein the coordination complex or the compound of Formula (VII) is finely emulsified in water and coated with a thin polymeric film. This formulation has the advantage of releasing the active substance gradually, achieving a considerable reduction in acute toxicity.

The formulation of the phytosanitary composition in liquid form is particularly preferred due to the ease of application on the plant by spraying or aerosol.

Examples of solid formulations of the phytosanitary composition of the invention include granules and dry powders.

The phytosanitary composition can be used in the form of a formulation for endotherapeutic treatments, i.e. by injecting it into the trunk of the plant.

In this endotherapic formulation, the phytosanitary composition will comprise especially formulated adjuvants already known per se to be injected along xylem vessels and spread along the latter.

Advantageously, the endotherapic formulation has lower washing action than atmospheric agents, prolonged persistence of action, reduction in application doses and less dispersion in the environment compared to formulations for external application.

The composition of the invention can also be in the form of a solid, liquid or gaseous formulation for gaseous treatments, i.e. fumigations.

The phytosanitary composition of the invention is advantageously suitable for use as a phytosanitary agent in plants.

As indicated above, the above composition is preferably used for the treatment of bacterial infections from gram negative bacteria, preferably from *Xylella fastidiosa*, on plants.

Advantageously, this composition is particularly effective in treating *Xylella fastidiosa* infections on olive plants.

Non-limiting examples of the treatment of olive plants infected with *Xylella fastidiosa* by applying the aforementioned phytosanitary compositions are reported in examples from 3.1 to 3.5.

Particularly preferred in the present invention is the use of the coordination complex of formula (II) in which the ligand L is 5-hydroxy-naphthalen-1,4 dione of formula (LII) or its anion complexed with the aforementioned transition metal, preferably copper or zinc, more preferably copper, even more preferably copper having an oxidation number 2.

Advantageously, the organic part of the coordination complex of formula (II), i.e. the binder LII is a compound already present in nature, its use as a phytosanitary agent therefore has a limited impact from the environmental point of view.

According to another preferred embodiment of the invention, the coordination complex (II) comprises a 5-hydroxy-naphthalene-1,4-dione ligand of formula (LII) or its anion complexed with zinc.

The coordination complex (I) of the invention can be prepared starting from the C5-hydroxy derivative of the coordination complex (I) in the un-complexed form, i.e. the ligand of formula (VII) indicated in the following reaction with the number 1 and for which $R^1$, $R^2$, $R^3$, $R^6$, $R^7$, $R^8$ have been previously defined.

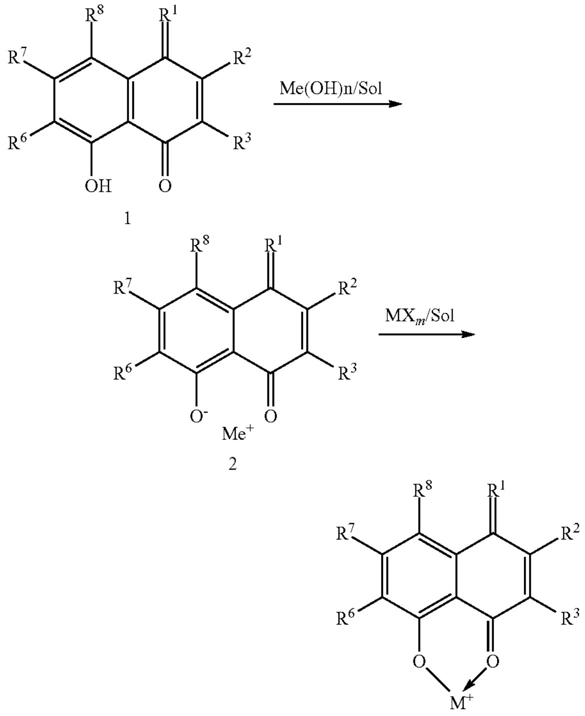

1

2

(I)

The hydroxyl derivative 1 is reacted with a hydroxide of the general formula $Me(OH)_n$, wherein Me is a metal and n is the oxidation number of this metal Me, so as to allow the release of the hydrogen of the hydroxyl group in C5 and the formation of the corresponding metal salt 2. In order to obtain the coordination complex (I) of the invention, the metal salt 2 is reacted in an equimolar quantity with an $MX_m$ salt, wherein M is the transition metal that will form the coordination complex (I), X is a halogen and m is the oxidation number of the transition metal M.

The $MeX_n$ salt is obtained as a by-product.

The above reactions are carried out in a protic solvent indicated in the reaction scheme as Sol, such as water, ethanol or methanol. The use of ethanol is particularly preferred.

Preferably, the reaction between the metal salt 2 and the $MX_m$ salt is carried out under reflux conditions.

According to the embodiment where the coordination complex has general formula (II) complexed with copper, said complex is prepared starting from an ethanolic solution of 5-hydroxy-naphthalene-1,4-dione of formula (LII), to which an ethanolic solution of sodium hydroxide is slowly added. $CuCl_2$ dissolved in ethanol is slowly added to this mixture. After the addition, reflux is maintained for about 3-7 hours, preferably about for 5 hours, then it is cooled and the solvent is evaporated under reduced pressure, thus obtaining 5-hydroxy-naphthalen-1,4-dione complexed with copper, i.e. the complex of general formula (II). The reaction by-product is instead NaCl.

The product obtained by the above reaction was structurally characterized by IR infrared spectroscopy and MS mass spectrometry analysis, as shown in detail in Example 2.

As already indicated above, the compound (VII), the coordination complex, preferably the complex of formula (I), and the phytosanitary composition of the invention advantageously exhibit antibacterial activity, preferably in the form of a phytosanitary agent against *Xylella fastidiosa.*

According to the invention, the compound (VII), the coordination complex, preferably the complex of formula (I), and the phytosanitary composition of the invention are used in the treatment of bacterial infections from gram negative bacteria in plants, preferably *Xylella fastidiosa.*

Particularly preferred is the use as a phytosanitary agent in olive plants. In particular, the compound (VII), the coordination complex, preferably the complex of formula (I), and the phytosanitary composition of the invention have advantageously proved to be suitable for use as phytosanitary agents in the treatment of *Xylella fastidiosa* infections, preferably in the treatment of *Xylella fastidiosa* infections of olive plants.

In this treatment, the compound (VII), the coordination complex, preferably the complex of formula (I), and the phytosanitary composition of the invention can be applied on the trunk and/or on the leaves of the infected plants. Preferably, they are also applied to the soil surrounding the infected plant, up to a radius of about 1-2 meters from the trunk of the plant.

Still preferably, the compound (VII), the coordination complex, preferably the complex of formula (I), and the phytosanitary composition of the invention are dissolved in an aqueous solvent prior to application on the plants, to favour their dispersion on the plant itself and, if applicable, in the surrounding land.

They are also applied each preferably in a quantity ranging from 100-250 mg, preferably about 200 mg for each treated plant. Non-limiting examples of the application of the aforementioned coordination complex (I) on olive plants infected with *Xylella fastidiosa*, are reported in examples from 3.1 to 3.3.

Moreover, non-limiting examples, of the application of compound (VII) on olive plants infected with *Xylella fastidiosa*, are reported in examples 3.4 and 3.5.

As already indicated above, it is assumed that the effectiveness of the coordination complex of the invention is partly due to the ability of its organic part, i.e. the ligand of Formula (VII), to be absorbed through the trunk of the plant to the xylem vessels, wherein the bacterium nestles and subsequently destroy or promote, through mechanisms internal to the bacterium itself, the destruction of the biofilm surrounding the microorganism itself, causing its death.

Regardless of the mechanism of action, the coordination complex, preferably the complex of formula (I) of the invention also has the advantage of being able to convey the transition metal to which it is coordinated, in particular inside the trunk of the plant.

Further, advantageously, when the transition metal is copper or other transition metal with antifungal activity, it can also carry out this antifungal action on the treated plant.

In fact, the coordination complex acts as a vehicle for the transition metal. This vehicle, being absorbable by the trunk of the plant, allows the metal to exert its fungicidal action in depth. In particular, this ability of the coordination assembly to convey the metal inside the trunk of the plant allows to obtain a fungicidal efficacy equal to or greater than that of the metal in the form of, for example, sulphate, oxychloride, hydroxide, etc. but, advantageously, by using smaller amounts of free metal and therefore with a lower risk of phytotoxicity.

This characteristic is particularly advantageous especially in organic farming.

Another advantage of the use of the compound (VII), the coordination complex, preferably the complex of formula (I), and the phytosanitary composition of the invention as phytosanitary agents is that of being harmless for insects, such as for example bees, in view of the fact that they are not toxic by contact or by ingestion.

According to other embodiments of the present invention, the compound (VII), the coordination complex, preferably the complex of formula (I), and the phytosanitary composition of the invention can be used in the form of a mixture with products having fertilizing action known per se.

The invention is now described with reference to some examples of embodiment of the coordination complex of the invention and its activity, of the compound of formula (VII) and of the phytosanitary composition for illustrative and non-limiting purposes of the invention.

Example 1. Synthesis of the Coordination Complex

1.1 Synthesis of 5-hydroxy-naphthalen-1,4-dione Complexed with Copper 0.23 mmoles of 5-hydroxy-naphthalen-1,4-dione are dissolved in 7.5 ml of ethanol. A 0.24 M ethanolic solution of NaOH is added to the obtained solution. The yellow solution turns purple instantly.

0.23 mmol of $CuCl_2$ dissolved in 2 ml of ethanol are slowly added to this mixture. After the addition, it is maintained under reflux for about 5 hours. The obtained solution is cooled and the present solvent is evaporated under reduced pressure obtaining the coordination complex of the invention 5-hydroxy-naphthalen-1,4-dione complexed with copper.

The reaction by-product is NaCl.

1.2 Synthesis of 5-hydroxy-naphthalen-1,4-dione Complexed with Nickel 0.23 mmoles of 5-hydroxy-naphthalen-1,4-dione are dissolved in 7.5 ml of ethanol. A 0.24 M ethanolic solution of NaOH is added to the obtained solution. The yellow solution turns purple instantly.

0.23 mmol of $NiCl_2$ dissolved in 2 ml of ethanol are slowly added to this mixture. After the addition, it is maintained under reflux for about 5 hours. The obtained solution is cooled and the present solvent is evaporated under reduced pressure obtaining the coordination complex of the invention 5-hydroxy-naphthalen-1,4-dione complexed with copper.

The reaction by-product is NaCl.

1.3 Synthesis of 5-hydroxy-naphthalen-1,4-dione Complexed with Zinc 0.23 mmoles of 5-hydroxy-naphthalen-1,4-dione are dissolved in 7.5 ml of ethanol. A 0.24 M ethanolic solution of NaOH is added to the obtained solution. The yellow solution turns purple instantly.

0.23 mmol of $ZnCl2$ dissolved in 2 ml of ethanol are slowly added to this mixture. After the addition, it is maintained under reflux for about 5 hours. The obtained solution is cooled and the present solvent is evaporated under reduced pressure obtaining the coordination complex of the invention 5-hydroxy-naphthalen-1,4-dione complexed with copper.

The reaction by-product is NaCl.

Example 2. Structural Characterization of the Coordination Complexes

The solid sample of each of the coordination complexes summarized in examples from 1.1 to 1.3 was deposited and directly pressed on a zinc selenide crystal of an Attenuated Total Reflection (ATR) device of an Equinox Bruker FTIR instrument for the determination of the corresponding IR spectrum.

The IR spectra were recorded in the wavenumbers range of between 4000 and 600 $cm^{-1}$, however the region between 1000 and 1800 $cm^{-1}$ is the region of most interest as it is here that the greatest absorption variations are located.

The recorded spectrum has a good correspondence with the simulated one obtained by DFT calculations at the theory level of B3LYP/6-311G (d), both as regards the number of bands and the respective absorption frequencies.

Spectra processing was performed using the OPUS 4.2 software, supplied with the instrument.

The value of the absorption frequencies must be considered with an error of ±1 $cm^{-1}$.

The structural characterization of the coordination complexes used in IR measurements was carried out through mass spectrometry (MS) measurements with electrospray ionization (ESI).

The MS analysis was performed at atmospheric pressure by spraying a solution of the coordination complex in a polar protic solvent methanol and water through a needle with high electrical potential, capable of donating or accepting a proton from the analyte molecule. Pseudo-molecular ions are formed, detectable in conditions of negative or positive ions.

An ionic trap analyzer (IT) was then used to differentiate the ions generated based on their mass/charge ratio (m/z).

The MS spectra were recorded with a BrukerEsquire-LCTM instrument, equipped with an electrospray source and an APCI analyzer, performing measurements in both positive and negative ions by direct infusion of a solution in water/acetonitrile.

2.1 IR Spectroscopy for the 5-hydroxy-naphthalen-1,4-dione Coordination Complex Complexed with Copper The coordination complex obtained in example 1.1 was analyzed by IR spectrum, as previously reported.

Figure 2:
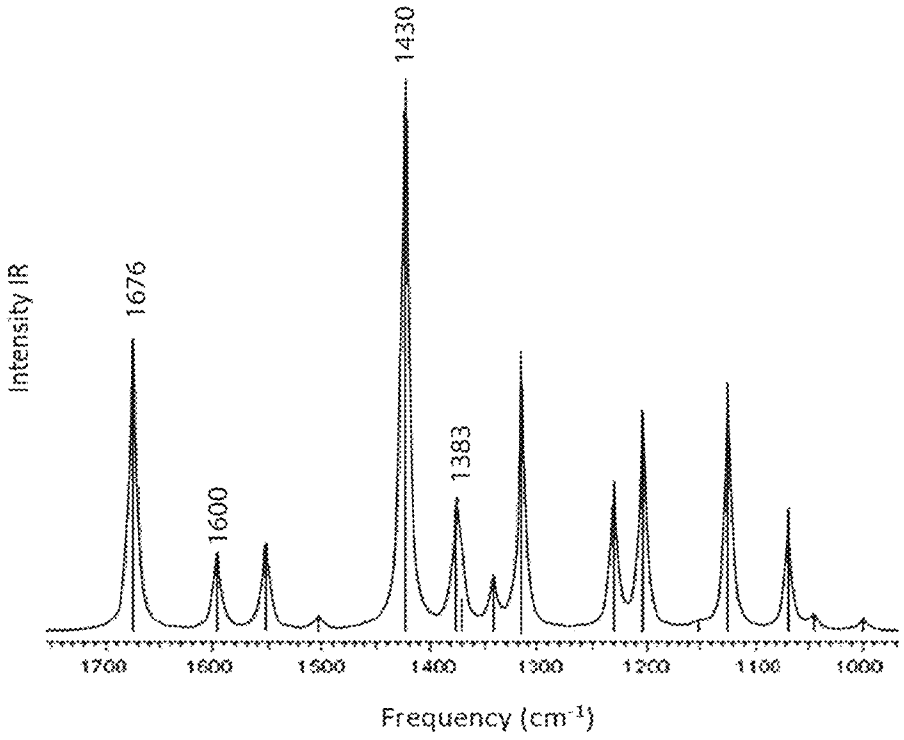
FIG. 2 shows the calculated IR spectrum of the coordination complex 5-hydroxy-naphthalene-1,4-dione complexed with copper.

From the obtained IR experimental spectrum, shown in FIG. 1, it was possible to determine the simulated spectrum, shown in FIG. 2, and assign stretching frequencies for groups:

a) group C═O in position 1 at 1676 $cm^{-1}$ which corresponds to an experimental absorption at 1655 $cm^{-1}$;

b) group C═O in position 4 presents two vibrational modes at 1430 and 1383 $cm^{-1}$ corresponding to 1424 and 1391 $cm^{-1}$ in the experimental spectrum;

c) the double bond C(2)=C(3) at 1600 $cm^{-1}$ corresponds to the experimental frequency at 1619 $cm^{-1}$;

d) the C(5)-O bond has two vibrational modes at 1430 and 1424 $cm^{-1}$ corresponding to the experimental absorption of 1452 and 1417 $cm^{-1}$.

From the assignment it results that the oxygen of C(4)=O coordinates through one of its free electronic doublets with the empty orbitals of type d of the metal ion, forming a bond that reduces its double bond character.

2.2 IR Spectroscopy for the 5-hydroxy-naphthalen-1,4-dione Coordination Complex Complexed with Nickel The coordination complex obtained in example 1.2 was analyzed by IR spectrum, as previously reported.

Figure 3:
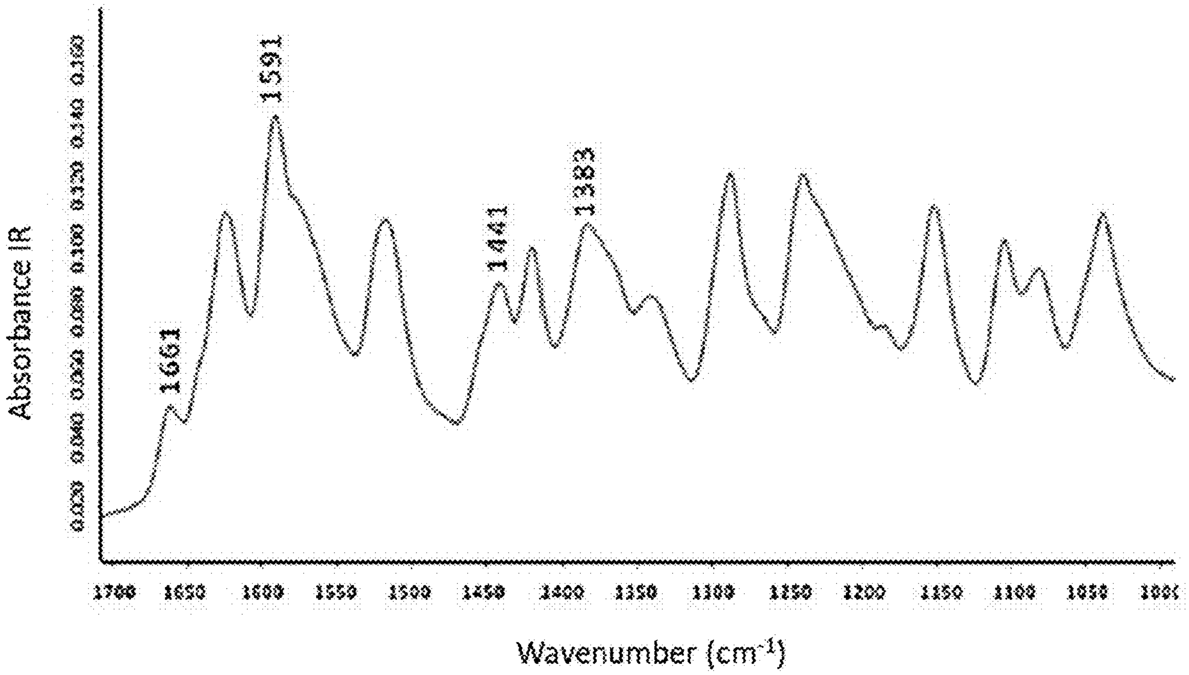
FIG. 3 shows the experimental IR spectrum of the 5-hydroxy-naphthalen-1,4-dione coordination complex complexed with nickel.
Figure 4:
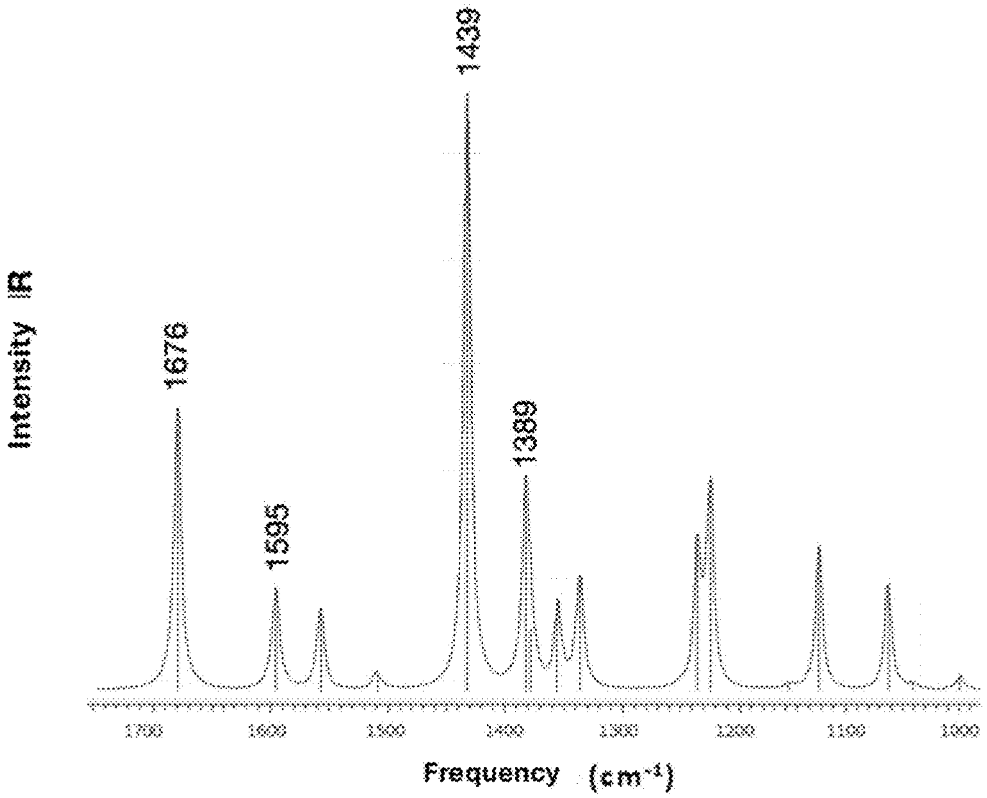
FIG. 4 shows the simulated IR spectrum of the coordination complex 5-hydroxy-naphthalene-1,4-dione complexed with nickel.

From the obtained experimental spectrum, shown in FIG. 3, it was possible to determine the simulated spectrum, shown in FIG. 4, and assign stretching frequencies for groups:

a) C(1)=0 at 1676 $cm^{-1}$ which corresponds to an experimental absorption at 1661 $cm^{-1}$;

b) C(4)=O has two vibrational modes at 1439 and 1389 $cm^{-1}$ corresponding to 1441 and 1383 $cm^{-1}$ in the experimental spectrum;

c) C(2)=C(3) at 1595 $cm^{-1}$ corresponding to the experimental frequency at 1591 $cm^{-1}$;

d) C(5)-O presents two vibrational modes at 1439 and 1441 $cm^{-1}$ corresponding to experimental absorption 1452 and 1417 $cm^{-1}$.

A very similar behaviour to the case of the copper coordination complex of example 1.1 was observed.

2.3 IR spectroscopy for the 5-hydroxy-naphthalen-1,4-dione Coordination Complex Complexed with Zinc The coordination complex obtained in example 1.3 was analyzed by IR spectrum, as previously reported.

Figure 5:
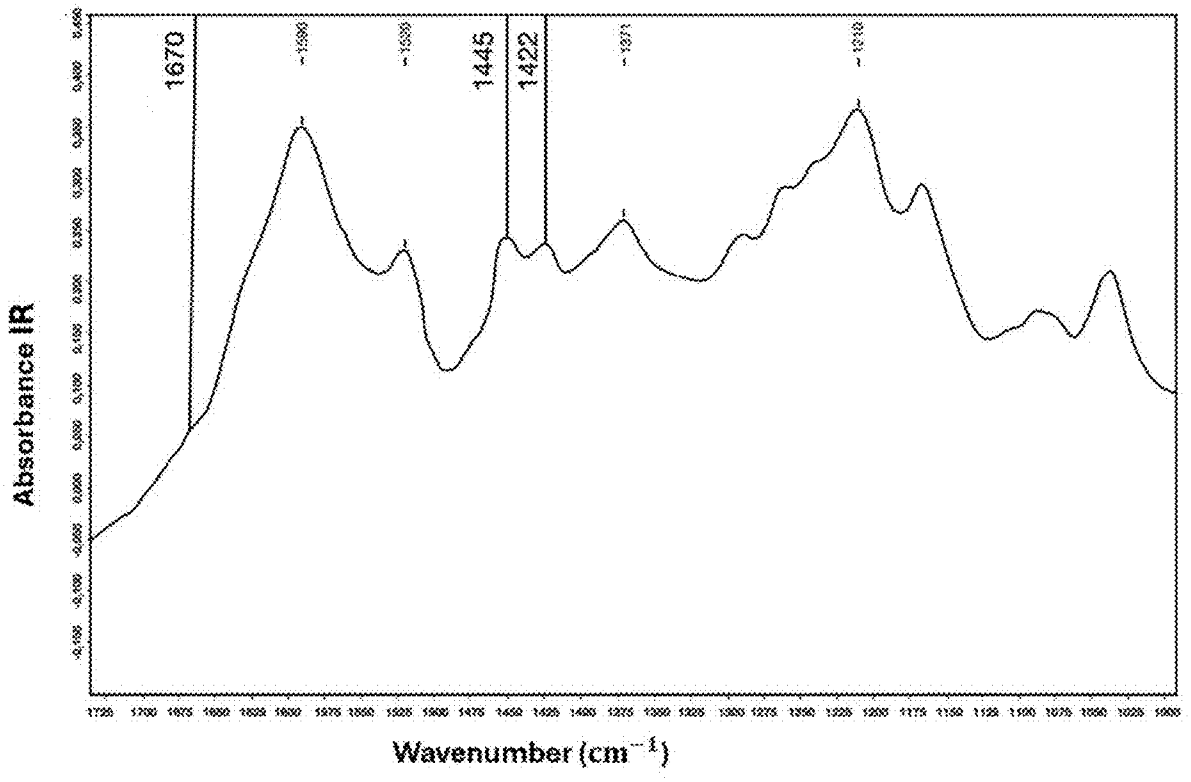
FIG. 5 shows the experimental IR spectrum of the coordination complex 5-hydroxy-naphthalene-1,4-dione complexed with zinc; is
Figure 6:
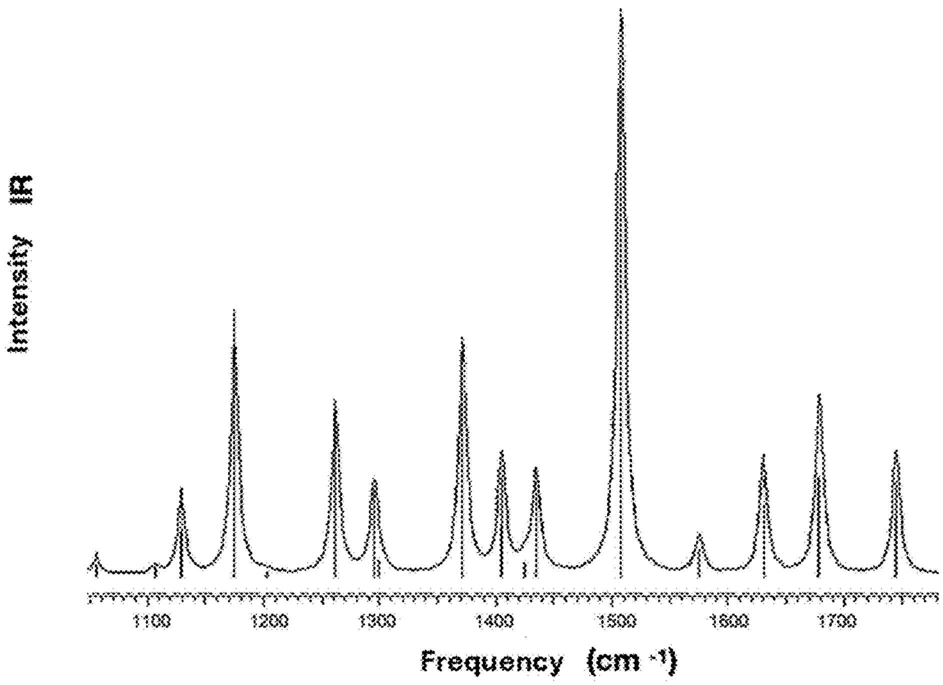
FIG. 6 shows the simulated IR spectrum of the 5-hydroxy-naphthalen-1,4-dione coordination complex complexed with zinc.

From the obtained experimental spectrum, shown in FIG. 5, it was possible to determine the simulated spectrum, shown in FIG. 6, and assign stretching frequencies for groups:

a) C(1)=0 at 1676 $cm^{-1}$ which corresponds to an experimental absorption at 1670 $cm^{-1}$;

b) C(4)=O has two vibrational modes at 1435 and 1373 $cm^{-1}$ corresponding to 1422 and 1371 $cm^{-1}$ in the experimental spectrum;

c) C(2)=C(3) at 1580 $cm^{-1}$ corresponding to the experimental frequency at 1590 $cm^{-1}$;

d) C(5)-O has two vibrational modes at 1435 and 1424 $cm^{-1}$ corresponding to experimental absorption 1445 and 1422 $cm^{-1}$.

A similar behaviour to that of the copper coordination complex of example 1.1 was observed.

Example 3. Treatment of *Xylella fastidiosa* Infection in Olive Plants

Fifteen olive trees present in the Salento area in southern Italy, infected with *Xylella fastidiosa* bacterium and showing advanced symptoms of complex rapid drying of the olive plant, were treated with the coordination complex of the invention and/or with the compound invention.

At the beginning of the treatment, these trees showed advanced desiccation of the branches and buds with the presence of numerous leaves with a crumpled and yellowish color.

3.1 Treatment with 5-hydroxy-naphthalen-1,4-dione Complexed with Copper

Three olive trees, among those described above, were treated with a phytosanitary composition comprising the 5-hydroxy-naphthalen-1,4-dione coordination complex complexed with copper and water.

For each plant, 200 mg of powdered 5-hydroxy-naphthalen-1,4-dione complexed with copper were suspended in bidistilled water to form a 5% w/v mixture. The suspension thus obtained, was sprayed on the foliage, on the trunk and on the soil strictly adjacent to the trunk.

This treatment was repeated on each plant 5 times, with a frequency of one treatment every 5 days until reaching 5 total treatments.

Results: Phenotypic improvements of the plant were observed with the birth of new shoots on the branches previously in a state of desiccation and disappearance of the crumpled and yellowish colored leaves.

At 9 months after the treatment specified above, the treated plants are still free of crumpled and yellowish colored leaves and dried branches.

3.2 Treatment with a Phytosanitary Composition Comprising 5-hydroxy-naphthalen-1,4-dione Complexed with Copper Three olive trees, including those infected with *Xylella fastidiosa* described above but different from those treated in example 3.1, were treated with a phytosanitary composition comprising 5-hydroxy-naphthalen-1,4-dione complexed with copper, colloidal copper and colloidal silver dissolved in bidistilled water.

For each plant, a phytosanitary composition was prepared by mixing in 200 ml bidistilled water: 150 mg of 5-hydroxy-naphthalene-1,4-dione complexed with copper, 100 ml of colloidal copper 40 ppm, 100 ml of colloidal silver 40 ppm.

The composition thus obtained, was sprayed on the foliage, on the trunk and on the soil strictly adjacent to the trunk.

This treatment was repeated on each plant 5 times, with a frequency of one treatment every 5 days until reaching 5 total treatments.

Results: Improvements of the infected plant have been observed with the birth of new shoots on the branches previously in a state of desiccation and disappearance of the leaves with crumpled appearance and yellowish color.

At 9 months after the treatment specified above, the treated plants are still free of crumpled and yellowish colored leaves and dried branches.

3.3 Treatment with a Phytosanitary Composition Comprising 5-hydroxy-naphthalen-1,4-dione Complexed with Copper and 5-hydroxy-naphthalen-1,4-dione Two olive trees, including those infected with *Xylella fastidiosa* described above but different from those treated in examples 3.1 and 3.2, were treated with a phytosanitary composition comprising 5-hydroxy-naphthalen-1,4-dione complexed with copper and 5-hydroxy-naphthalen-1,4-dione dissolved in bidistilled water.

For each plant, a phytosanitary composition was prepared by mixing in 200 ml distilled water: 45 ppm of 5-hydroxy-naphthalen-1,4-dione complexed with copper and 40 ppm of 5-hydroxy-naphthalen-1,4-dione powder obtained by crushing and drying walnut husk.

The suspension thus obtained, was sprayed on the foliage, on the trunk and on the soil strictly adjacent to the trunk.

This treatment was repeated on each plant 5 times, with a frequency of one treatment every 5 days until reaching 5 total treatments.

Results: Improvements of the infected plant have been observed with the birth of new shoots on the branches previously in a state of desiccation and disappearance of the leaves with crumpled appearance and yellowish color.

At 9 months after the treatment specified above, the treated plants are still free of crumpled and yellowish colored leaves and dried branches.

3.4 Treatment with 5-hydroxy-naphthalene-1,4-dione

Four olive trees, including those infected with *Xylella fastidiosa* described above but different from those treated in the previous examples, were treated with a phytosanitary composition comprising the compound of formula (VII) 5-hydroxy-naphthalen-1,4-dione and water.

For each plant, 150 mg of 5-hydroxy-naphthalen-1,4-dione powder were suspended in bidistilled water to form a 5% w/v mixture. The suspension thus obtained, was sprayed on the foliage, on the trunk and on the soil strictly adjacent to the trunk.

This treatment was repeated on each plant 5 times, with a frequency of one treatment every 5 days until reaching 5 total treatments.

Results: Phenotypic improvements of the plant were observed with the birth of new shoots on the branches previously in a state of desiccation and disappearance of the crumpled and yellowish colored leaves.

At 9 months after the treatment specified above, the treated plants are still free of crumpled and yellowish colored leaves and dried branches.

3.5 Treatment with a Phytosanitary Composition Comprising 5-hydroxy-naphthalene-1,4-dione Three olive trees, including those infected with *Xylella fastidiosa* described above but different from those treated in the previous examples, were treated with a phytosanitary composition comprising 5-hydroxy-naphthalene-1,4-dione, colloidal copper and colloidal silver dissolved in distilled water.

For each plant, a phytosanitary composition was prepared by mixing in 200 ml distilled water: 150 mg of 5-hydroxy-naphthalen-1,4-dione, 100 ml of colloidal copper 40 ppm, 100 ml of colloidal silver 40 ppm.

The composition thus obtained was sprayed on the foliage, on the trunk and on the soil strictly adjacent to the trunk.

This treatment was repeated on each plant 5 times, with a frequency of one treatment every 5 days until reaching 5 total treatments.

Results: Improvements in the general condition of the infected plant were observed. In particular, new shoots were observed on the branches previously in a state of desiccation and disappearance of the leaves with a crumpled appearance and yellowish color.

At 9 months after the treatment specified above, the treated plants are still free of crumpled and yellowish colored leaves and dried branches.

On the basis of the foregoing, therefore, the present invention has achieved all the intended purposes.

In particular, the aim of achieving a phytosanitary product that can be used in the treatment of *Xylella fastidiosa* infection in plants, in particular in olive trees, is achieved.

It is still an achieved aim of the invention, to propose a use of the aforementioned product for the treatment of *X. fastidiosa* of plants.

Last but not least, it is an achieved aim of the invention to realize a phytosanitary composition to be used in the treatment of *Xylella fastidiosa* in plants.

The invention claimed is:

1. A method for the treatment of bacterial and fungal infections in plants comprising the step of using an organometallic coordination complex, or its phytopharmaceutically acceptable salt, of a $M^{m+}$ metal and at least one L ligand, wherein the ligand L is selected from 5-hydroxy-naphthalene-1,4-dione (LII)

(LII)

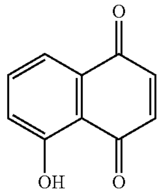

or its anion, and (LIII)

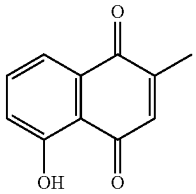

or its anion.

where $M^{m+}$ is a transition metal having an oxidation number m.

2. The method according to claim 1, wherein the treatment is against *Xylella fastidiosa*.

3. The method according to claim 1, wherein the transition metal $M^{m+}$ is selected from the group consisting of manganese, iron, cobalt, nickel, copper and zinc.

4. The method according to claim 3, wherein the transition metal $M^{m+}$ is copper or zinc.

5. The method according to claim 4, wherein the transition metal $M^{m+}$ is copper.

6. The method according to claim 1, wherein said plant is selected from the group consisting of olive, citrus fruit, grapevine, almond, apple, pear, oleander, different species of forest essences and ornamental plants.

7. The method according to claim 6, wherein said plant is olive.

8. A phytosanitary composition comprising:

an organometallic coordination complex, or its phytopharmaceutically acceptable salt, of a $M^{m+}$ metal and at least one L ligand, wherein the ligand L is selected from 5-hydroxy-naphthalene-1,4-dione (LII)

(LII)

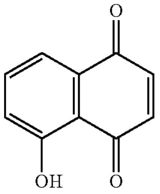

or its anion, and (LIII)

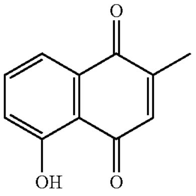

or its anion, where $M^{m+}$ is a transition metal having an oxidation number m, and an additional compound of the general formula (LII)

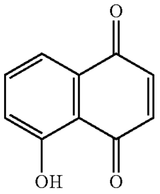

or (LIII)

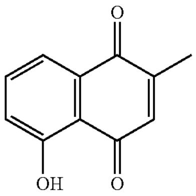

.

9. The phytosanitary composition according to claim 8, wherein said composition further comprises at least one phytopharmaceutically acceptable vehicle and/or at least one phytopharmaceutically acceptable excipient.

10. The phytosanitary composition according to claim 9, wherein said at least one vehicle is water.

11. A method for the treatment of bacterial and fungal infections comprising the step of using the composition according to claim 8.

* * * * *